Figure 1:
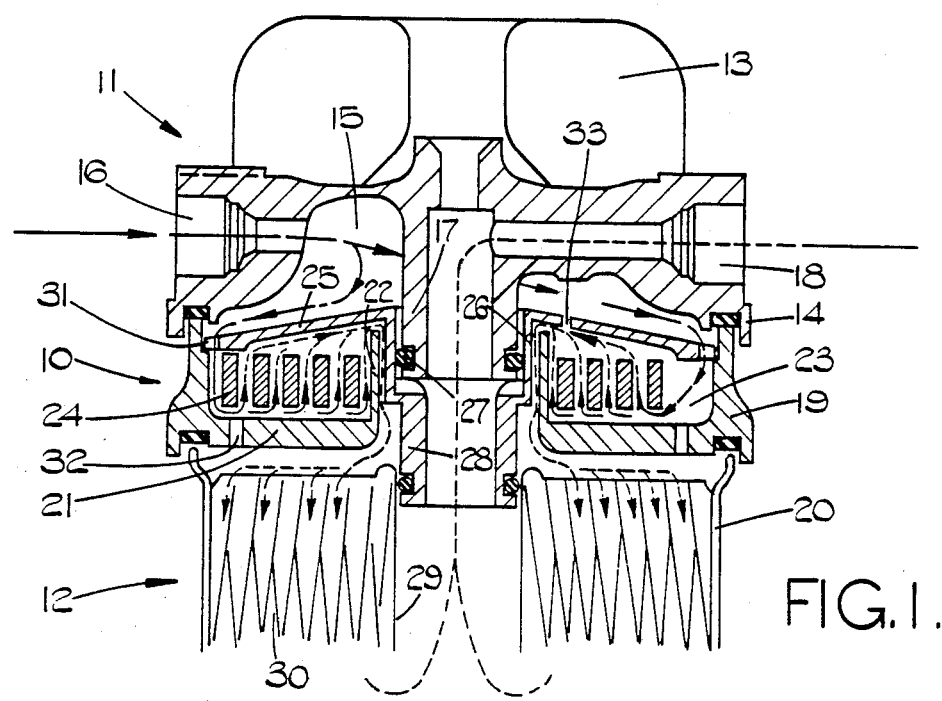

United States Patent

Bradford et al.

[11] Patent Number: 4,646,703
[45] Date of Patent: Mar. 3, 1987

[54] FUEL HEATER

[75] Inventors: Peter F. Bradford; Michael R. Bungay, both of Sudbury; Christopher J. Kember, Stowmarket, all of England

[73] Assignee: Lucas Industries, Birmingham, England

[21] Appl. No.: 743,642

[22] Filed: Jun. 11, 1985

[30] Foreign Application Priority Data

Jun. 26, 1984 [GB] United Kingdom ............... 8416250
Mar. 7, 1985 [GB] United Kingdom ............... 8505963

[51] Int. Cl.⁴ ............................................ F02M 31/12
[52] U.S. Cl. .................................... 123/557; 123/549; 210/184
[58] Field of Search ............ 123/552, 549, 557; 210/184-186

[56] References Cited

U.S. PATENT DOCUMENTS

| | | | |
|---|---|---|---|
| 4,372,260 | 2/1983 | Baker | 123/557 X |
| 4,387,691 | 6/1983 | Marcoux | 123/557 |
| 4,406,785 | 9/1983 | Siefer | 123/557 |
| 4,473,054 | 9/1984 | Marcoux | 123/557 |
| 4,479,477 | 10/1984 | Manchester | 123/557 |
| 4,501,255 | 2/1985 | Van Der Ploeg et al. | 123/557 |
| 4,502,955 | 3/1985 | Schaupp | 123/557 |
| 4,529,866 | 7/1985 | Leary | 123/557 |

Primary Examiner—Tony M. Argenbright

[57] ABSTRACT

A fuel heater for heating fuel flowing in the fuel system of an internal combustion engine has an annular heating chamber in which is mounted a heating element formed from a material having a non-linear positive temperature coefficient of resistance. The element defines an upwardly extending flow passage and the heater includes a cup-shaped support member having a central aperture and an annular baffle plate 25 which forms the upper wall of the chamber. Cold fuel is led through gaps at the outer edge of the baffle plate and flows along the base wall of the chamber and then upwardly through the flow passage of the element. The heated fuel flows from the chamber through a space defined between an upwardly extending lid of the support member and a depending tubular element of the baffle plate.

12 Claims, 4 Drawing Figures

FUEL HEATER

This invention relates to an electrically powered fuel heater for heating fuel flowing in a fuel system of an internal combustion engine in order to minimise the risk of fractions of the fuel freezing in cold weather.

It is convenient to construct the fuel heater in a form in which it can be incorporated into an existing fuel system and it is particularly convenient to so design and construct the heater that it can be inserted between the mounting and the fuel treatment element of a fuel treatment unit.

The object of the invention is to provide a fuel heater of the kind specified in a simple and convenient form.

According to the invention an electrically powered fuel heater for the purpose specified comprises a support member of cup shaped form, a central aperture defined in the base wall of the support member, an upstanding lip defined about said aperture, said support member and lip defining an annular fuel heating chamber, an annular baffle plate extending over said chamber, flow apertures communicating with the exterior of said chamber whereby fuel flowing into said chamber will be directed adjacent the base wall of the support member, an electric heating element located in the chamber, said heating element defining a flow passage or flow passages therethrough which extend upwardly substantially at right angles to the base wall of the support member, said heating element being spaced from said base wall and from the baffle plate, and the baffle plate at its inner periphery being secured or being formed with a depending tubular element extending inwardly of and spaced from said upstanding lip, the fuel being heated as it rises through said flow passage or passages and flowing from said chamber through the space defined between said tubular element and said lip.

Figure 2:
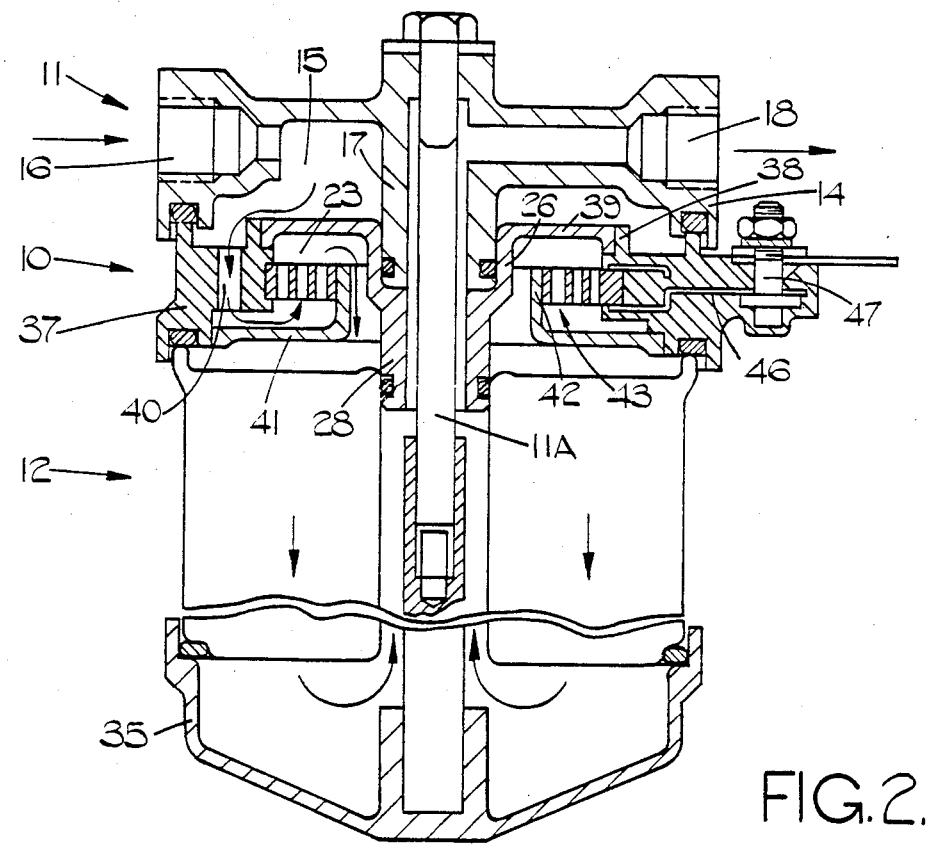
Figure 3:
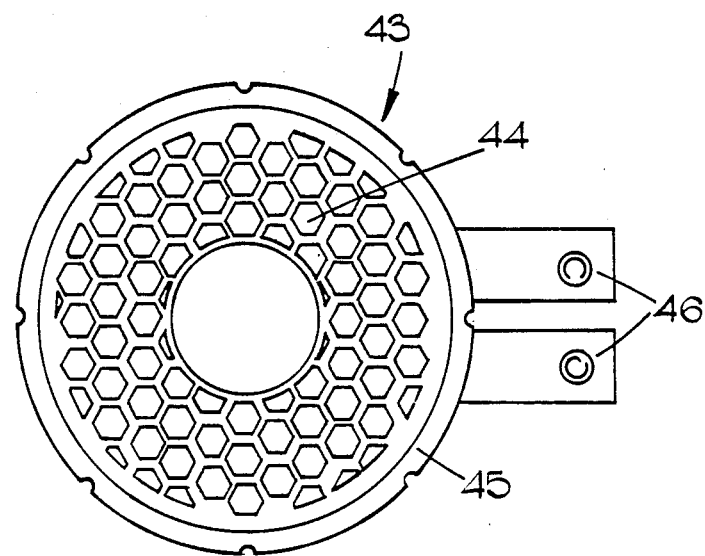
Figure 4:
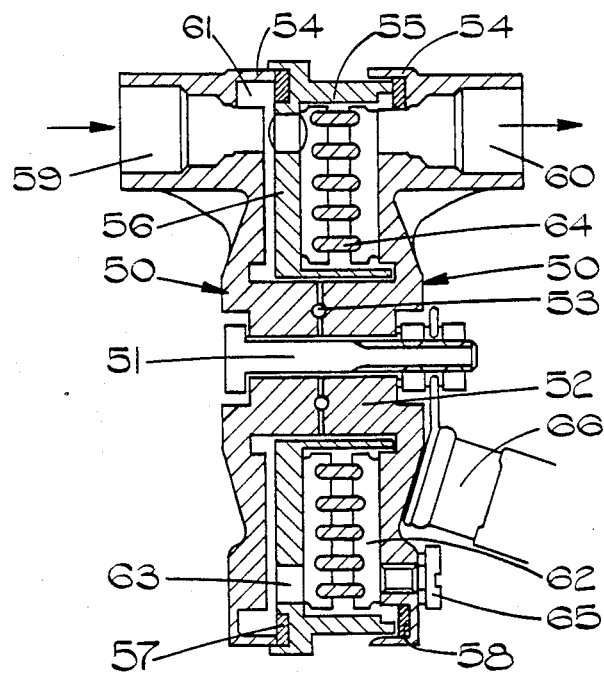

In the accompanying drawings:

FIG. 1 is a sectional side elevation of one example of a fuel heater in accordance with the invention shown in position between a mounting and fuel treatment device, FIG. 2 is a view similar to FIG. 1 showing another example of the heating device, FIG. 3 is a plan view of the heating element of the heater of FIG. 2, and FIG. 4 is a sectional side elevation of another example of fuel heater.

Referring to FIG. 1 of the drawings the heating device generally indicated at 10, is sandwiched between a mounting generally indicated at 11 and a fuel treatment device which in the particular example is shown as a filter element 12. The three components are held in assembled relationship by means of a through bolt shown at 11A in FIG. 2. The treatment device may however be a so called sedimentor in which the fuel flows into a chamber and particles of dirt and water separate from the fuel by the process of sedimentation.

The mounting includes flanges 13 whereby it can be mounted on a support structure and it defines an annular depending rim 14 in the underside of which is formed a recess to accommodate a seal member. The mounting has an inlet chamber 15 which communicates with a fuel inlet 16 which is connected in use, to a source of fuel. In addition, the mounting defines a depending central tubular spigot 17 the interior of which is connected to a fuel outlet 18. Fuel passes between the inlet 16 and the outlet 18 in use, due to the action of a fuel pump which may be positioned upstream or downstream of the treatment device.

The fuel heater 10 includes a cup-shaped support member 19 the upper end of the wall of which is adapted to locate against the seal housed in the rim 14. Moreover, formed in the lower wall of the support member is a recess which accommodates a further seal which forms a fluid tight seal between the cup-shaped member and the can 20 of the filter element.

The base wall 21 of the support member defines a central aperture about which is formed an upstanding lip 22 and the lip and the side wall of the support member define a fuel heating chamber 23. Within the chamber there is located a spirally wound electric heating element 24. Conveniently the element is of rectangular section and is formed from an electrically conductive polymer material having a non-linear positive temperature coefficient of resistance. The longest sides of the element extend vertically and the lower edge of the element is spaced from the base wall 21 of the support member by thin radial electrically insulating supports (not shown) which also act to space the turns of the element.

Also forming part of the heater unit is a baffle plate 25 which is of annular form and which inclines downwardly towards its outer peripheral surface. The outer surface of the baffle plate is spaced from the adjacent wall of the support member by lugs and at its inner peripheral surface the baffle plate is connected to and conveniently is formed integrally with a depending tubular element 26 the outer surface of which is spaced from the internal surface of the lip 22. The internal surface of the element 26 engages an annular seal member 27 carried by the spigot 17. The tubular element is integrally formed with a hollow spigot member 28 which like the spigot member 17 is provided with a peripheral seal which forms a seal with a central tubular member 29 forming part of the filter element. In order to locate the tubular element 26 within the lip 22 it can be provided with axial ribs which allow the passage of fuel and further ribs are provided on the upper end of the spigot member 28 to locate against the spigot 17. The upper edge of the element 24 is spaced from the undersurface of the baffle plate 25 by radial supports not shown.

The filter element between the can 20 and the tubular member 29 incorporates a filter medium 30 which conveniently is formed from pleated paper.

In use, fuel flowing through the inlet conduit 16 enters the chamber 15 and falls downwardly over the upper surface of the baffle plate 25 and down between gaps 31 defined between the edge of the baffle plate and the outer wall of the support member. The fuel continues its downward movement until it encounters the base wall of the support member. It then tends to flow horizontally along the space defined between the base wall and the lower edge of the heating element. As the fuel is heated by the heating element it flows upwardly aided by convection through a flow passage defined between the turns of the element to the upper portion of the chamber 23 where it is guided by the undersurface of the baffle plate into the gap defined between the lip 22 and the tubular element 26. It is then forced to flow downwardly and into the filter element 12 where it first flows through the filter medium 30 and then flows upwardly through the tubular member 29, the spigot members 28 and 17, to the outlet 18. By arranging the flow pattern as described the heated fuel flows upwardly in the chamber 23 and all parts of the heating element are cooled by the cold fuel and the maximum heating effect of the fuel is obtained. The possibility of portions of the heating element becoming excessively hot and thereby reducing the current flow in the element is minimised.

The fuel flowing into the inlet 16 will in practice contain water and also air. The water is allowed to flow from the chamber 23 directly to the filter medium by way of apertures 32 formed in the base wall 21 of the support member. The accumulation of air in the chamber 23 is minimised by the provision of a small orifice 33 in the baffle plate 25 extending into the outlet conduit chamber 15 and a small vent may be provided to vent the chamber 15 to the outlet 18.

Referring to FIG. 2 of the drawings there is shown a fuel treatment unit including the heater which is generally indicated at 10 and is sandwiched between a mounting 11 and the upper end of a fuel filter element 12. The lower end of the filter element is engaged by an end closure 35 and the unit is held in assembly by the through bolt 11A. The mounting defines an annular depending rim 14 in the underside of which is formed a recess to accommodate a seal member. The mounting has an inlet chamber 15 which communicates with a fuel inlet 16 which in use is connected to a source of fuel. In addition the mounting defines a depending central tubular spigot 17 through which the mounting bolt 11A extends with clearance and the interior of the spigot is connected to an outlet 18.

The fuel heater 10 comprises a cup shaped body 37 the annular wall of which is formed as a moulding of a convenient fuel resistant material such for example as glass or mineral filled NYLON. The body defines an upper outer rim for engagement with the seal carried by the mounting and it defines a lower recess which carries a seal member engaged by a rim of the fuel filter element.

At its upper end the body 37 defines an inner annular upstanding rim 38 to which is secured the outer peripheral surface of an annular baffle plate 39. At its inner end the baffle plate is connected to a tubular element 26 which leads into a spigot member 28. The spigot members 17 and 28 each incorporate grooves which accommodate seal members whereby a fuel tight seal is established between the tubular element 26 and the spigot 17 and an inner tubular member of the filter and the spigot member 28.

The annular body 37 is provided with a plurality of angularly spaced flow apertures 40 through which in use, fuel can flow from the inlet chamber 15 into a fuel heating chamber 23. The lower wall of the support body and chamber 23, is defined by an annular base wall section 41 which has its outer peripheral surface secured to the moulding forming the wall of the body. At its inner surface the base wall section joins a tubular section 42 which extends upwardly towards the baffle plate 39. The tubular section 42 has a clearance with the element 26 and through which in use the heated fuel in the upper region of the heating chamber 23 can flow into the filter element.

Within the heating chamber 23 is an annular heating element 43. The element 43 is formed as a sub-assembly and is then incorporated into the body 37 during the moulding process of the body. FIG. 3 shows the heating element assembly prior to the moulding operation and it comprises a honeycomb structure 44 formed from a ceramic material having a positive temperature coefficient of resistance. The ceramic material after moulding and baking, is coated over its entire end surfaces with a conductive material for example such as brass or aluminium, following which annular end plates 45 are secured to the structure as by brazing or soldering. The plates 45 are provided with terminal strips 46 respectively. As previously mentioned the heating element 43 is moulded into the body 37 after terminals 47 have been connected to the plates 46 respectively. The ceramic material is coated with a fuel resistant layer such for example as fluorinated ethylene propylene so that contact between the fuel and the ceramic material is prevented.

In operation, the cold fuel flows through the apertures 40 into the lower portion of the heating chamber 23 and it then flows upwardly aided by convection through the flow passages defined by the honeycomb structure to the upper portion of the heating chamber. During the passage of the fuel through the honeycomb structure it becomes heated and the heated fuel flows between the tubular section 42 and the element 26 into the fuel filter.

In order to prevent the accumulation of air within the upper portion of the heating chamber a small aperture or apertures may be provided in the baffle plate 39.

Instead of forming the heating element to annular form honeycomb material it may comprise a plurality of sections of honeycomb material mounted on apertured supporting plates.

Turning now to FIG. 4 there is shown a fuel heating device which is intended to be connected in a fuel line and which comprises a pair of housing parts 50 formed as identical castings and which can be secured together by means of a bolt 51. Each housing part has a cylindrical central portion 52 through which the bolt passes, the portions 52 being held in end to end engagement by the bolt. An annular seal member 53 is located in the presented faces of the portions to prevent leakage of fuel into the bolt apertures. Each housing part defines an annular rim 54, the two rims 54 being spaced from each other.

The rims engage and locate the outer annular wall 55 of a support member which on one side is integrally formed with an annular wall 56 disposed at right angles to the wall 55. The wall 56 defines a recess adjacent its outer extremity in which is located a seal member 57 and the rim of the wall 55 locates against a seal member 58 carried in a recess in the housing part. The rim of the other housing part 50 engages the seal member 57 and with the bolt 42 tightened a fuel tight enclosure is obtained.

Each housing part defines a screw threaded fuel passage. The passage 59 in the left hand housing part 50 forms a fuel inlet and the passage 60 in the right hand housing part forms a fuel outlet. The fuel flowing through the inlet 59 flows into a space 61 defined between the housing part and the wall 56 of the support member and as this fuel is cold it is passed to the lower portion of the annular heating chamber 62 defined by the right hand housing part and the support member, through an aperture 63 formed in the wall 56. The outlet 60 connects directly with the heating chamber and in use it is arranged that the aperture 63 is vertically below the outlet 60.

Within the heating chamber there is mounted a spirally wound heating element 64 the turns of which are spaced from each other, the element being of the same material as described with reference to FIG. 1. The element is supported by a plurality of radially disposed supports which are formed from insulating material. The supports are located on both sides of the element but are alternately arranged since if two supports were aligned they would impede the flow of fuel. As the cold fuel flows into the heating chamber and becomes heated it rises through the chamber and the supports guide the fuel so that all parts of the heating element are exposed to a flow of fuel and are thereby cooled. The risk of portions of the elements overheating is thereby minimised.

One housing part is provided with a drain plug 65 whereby water accumulating in the chamber can be drained away.

It will be noted that the support members of the examples of FIGS. 1 and 4 together with the heating elements, are of identical construction. In the example of FIG. 1 two drain apertures 32 are provided and in the example of FIG. 4 an aperture 63 is provided for the fuel flow into the heating chamber. The support member as supplied is provided with two knock out plugs one or both of which are removed depending upon the application.

Also shown in FIG. 4 is a temperature sensor 66 which is maintained in close thermal contact with the right hand housing part, and which is used to control the operation of the heating element. A similar sensor can be used with the arrangement shown in FIG. 1.

In an alternative version the heating element 45 shown in FIG. 2 may be positioned between the filter element 12 and the end closure 35 and the direction of fuel flow through the treatment device reversed. In this case the fuel flows upwardly through the heating element and there is no need for the baffle plate 39 and the tubular element 26 or the annular base wall sections 41. A tubular section similar to the section 42 is required in this case the section locating within the lower portion of the tube 29 of the filter element, a clearance existing between the through bolt and the tubular section to allow fuel flow.

We claim:

1. An electrically powered fuel heater for heating fuel flowing in a fuel system of an internal combustion engine, comprising a support member of cup-shaped form, a central aperture defined in the base wall of the support member, an upstanding lip defined about said aperture, said support member and lip defining an annular fuel heating chamber, an annular baffle plate extending over said chamber, flow apertures communicating with the exterior of said chamber whereby fuel flowing into said chamber will be directed adjacent the base wall of the support member, an electric heating element located in the chamber, said heating element defining a flow passage or flow passages therethrough which extend upwardly substantially at right angles to the base wall of the support member, said heating element being spaced from said base wall and from the baffle plate, and the baffle plate at its inner periphery being secured or being formed with a depending tubular element extending inwardly of and spaced from said upstanding lip, the fuel being heated as it rises through said flow passage or passages and flowing from said chamber through the space defined between said tubular element and said lip.

2. A heater according to claim 1 in which said heating element is formed from a material having a non linear positive temperature coefficient of resistance.

3. A heater according to claim 2 in which said heating element is of elongated form and is spirally wound, spacer means being provided to space the adjacent turns to define said flow passage, said spacer means also acting to space the element from the base wall of the cup-shaped member and the undersurface of the baffle plate.

4. A heater according to any one of the claims 1, 2 or 3 in which the undersurface of the baffle plate slopes downwardly and outwardly towards the base wall of the cup-shaped member.

5. A heater according to claim 4 in which said flow apertures are defined by gaps between the outer edge of the baffle plate and the adjacent side wall of the cup-shaped member, said baffle plate being located by lugs on the baffle plate which engage said wall, said gaps being defined between adjacent lugs respectively.

6. A heater according to claim 2 in which said heating element comprises a honeycomb structure of ceramic material, the ceramic material being coated with a layer of material resistant to the fuel to be heated.

7. A heater according to claim 6 in which the honeycomb structure is supported between a pair of spaced electrically conductive plates which mount terminal strips respectively whereby electric current can be passed through the structure.

8. A heater according to claim 7 in which the honeycomb structure is of annular form and the outer peripheral portions of the structure together with the plates are moulded into the wall of the support member.

9. A heater according to claim 8 in which said flow apertures are defined by passages formed in the moulded wall of the support member.

10. A heater according to any one of the claims 1, 2, 3, 6, 7, 8 or 9 in which said tubular element has an internal dimension so that it can locate about a depending spigot of a mounting of a fuel treatment unit said tubular element being further extended to define a hollow spigot member for engagement with a fuel treatment element forming part of the fuel treatment unit.

11. A heating according to claim 10 in which the wall of said support body defines an upwardly extending rim for engagement in use with an annular seal member carried by said mounting, said wall of the support body also defining an annular recess to accommodate a seal member engaged in use by a part of the fuel treatment element.

12. A heater according to claim 1 in which the base wall of the support member is provided with an aperture or apertures to allow water to escape from the heating chamber.

* * * * *